Figure 1:
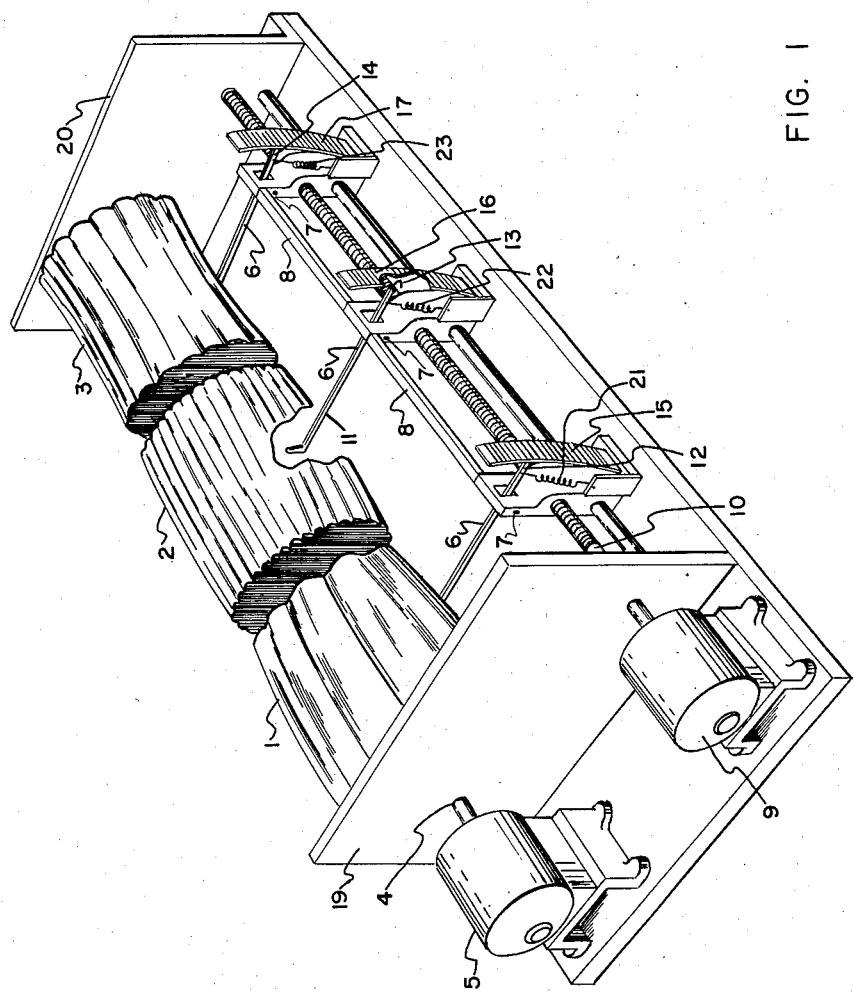

Dec. 27, 1960  E. G. SCHWARM  2,965,976
NAVIGATION TRAINING APPARATUS
Filed June 11, 1956  3 Sheets-Sheet 1

EDWARD G. SCHWARM
*INVENTOR.*

BY *Darby & Darby*

Dec. 27, 1960 E. G. SCHWARM 2,965,976
NAVIGATION TRAINING APPARATUS
Filed June 11, 1956 3 Sheets-Sheet 2

EDWARD G. SCHWARM
INVENTOR.

BY Darby & Darby

Dec. 27, 1960     E. G. SCHWARM     2,965,976
NAVIGATION TRAINING APPARATUS
Filed June 11, 1956     3 Sheets-Sheet 3

EDWARD G. SCHWARM
*INVENTOR.*

BY *Darby & Darby*

United States Patent Office 2,965,976
Patented Dec. 27, 1960

2,965,976

NAVIGATION TRAINING APPARATUS

Edward G. Schwarm, Binghamton, N.Y., assignor to General Precision, Inc., a corporation of Delaware Filed June 11, 1956, Ser. No. 590,693

17 Claims. (Cl. 35—10.2)

This invention relates to apparatus for use in training navigators and pilots in the proper use of direction indicating equipment, and more specifically, to improved simulation of magnetic compass operation in grounded navigation training equipment.

As is well-known in the aviation and navigation arts, none of the magnetic direction indicating systems which have been devised for use in actual aircraft or ships provide perfect indications of aircraft heading, and a very important phase of precise navigation is the proper correction or compensation of indicated heading readings to minimize the effects caused by the limitations of the compass systems.

Various systems for simulating magnetic compass operation for training purposes are known in the prior art, and many of these systems have been considered sufficiently realistic and accurate in the past. However, the advent of the very high speed aircraft and the present requirements for extremely precise navigation have made it desirable that more realistic and accurate simulation of magnetic compass operation be provided in grounded training devices.

Prior art grounded training devices for craft utilizing magnetic direction indicating devices have simulated magnetic variation by means of manual adjustment operated by the instructor, with resultant unrealistic magnetic indications accruing with changes of simulated positions unless the instructor takes great pains to make frequent adjustments. While prior art has attempted to duplicate the ineffectiveness of a compass diving craft maneuvers, and to a limited degree the visual effects on the compass due to these maneuvers, no known devices have been able to simulate the actual compass errors in degrees during normal maneuvers with any measure of accuracy. Nothing in the prior art simulates accurately the magnitude and sense of the numerous dynamic compass errors resulting from changes of simulated heading, acceleration, attitude and position on the earth's surface of simulated craft. The present invention simulates the characteristics of the earth's field and its generation of an accurate compass error with changes in heading, acceleration, attitude and position on the earth's surface of a simulated craft. The present invention also simulates the compass error resulting from the permanent magnet material in the frame of the simulated craft. In accordance with the need for increasingly accurate navigation of those craft dependent on magnetic indicators, the magnetic compass error simulation system of this invention is a valuable aid for producing the necessary operational environment in the training arts.

It is therefore a primary object of the invention to provide improved grounded training apparatus for simulation of errors caused by operational limitations of magnetic direction indicating equipment.

Another object of this invention is to provide improved apparatus for simulating errors in magnetic direction indicators due to changes in position of a simulated craft.

A further object of this invention is to provide improved apparatus for simulating errors in magnetic direction indicators due to changes in attitude of a simulated craft.

Another object of this invention is to provide improved apparatus for simulating errors in magnetic direction indicators due to changes in heading of a simulated craft.

Still another object of this invention is to provide improved apparatus for simulating errors in magnetic direction indicators due to accelerations of a simulated craft.

An additional object of this invention is to simulate errors in magnetic direction indicators caused by the permanent magnetism of portions of the structure of a simulated movable craft.

Another object of this invention is to provide improved apparatus for simulating errors in magnetic direction indicators caused by action of the earth's induced magnetism on soft iron portions built into a movable craft.

Figure 2:
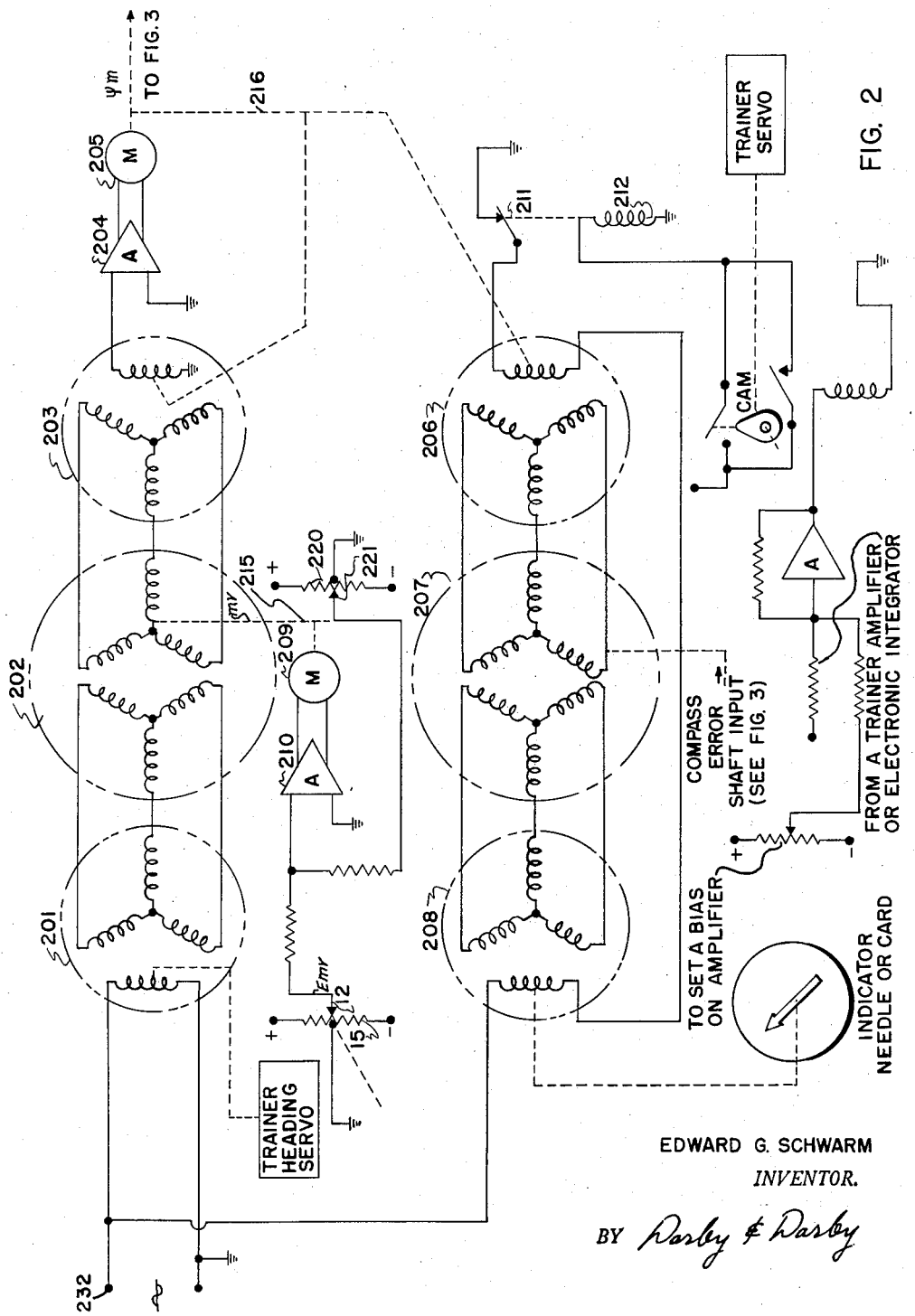
Figure 3:
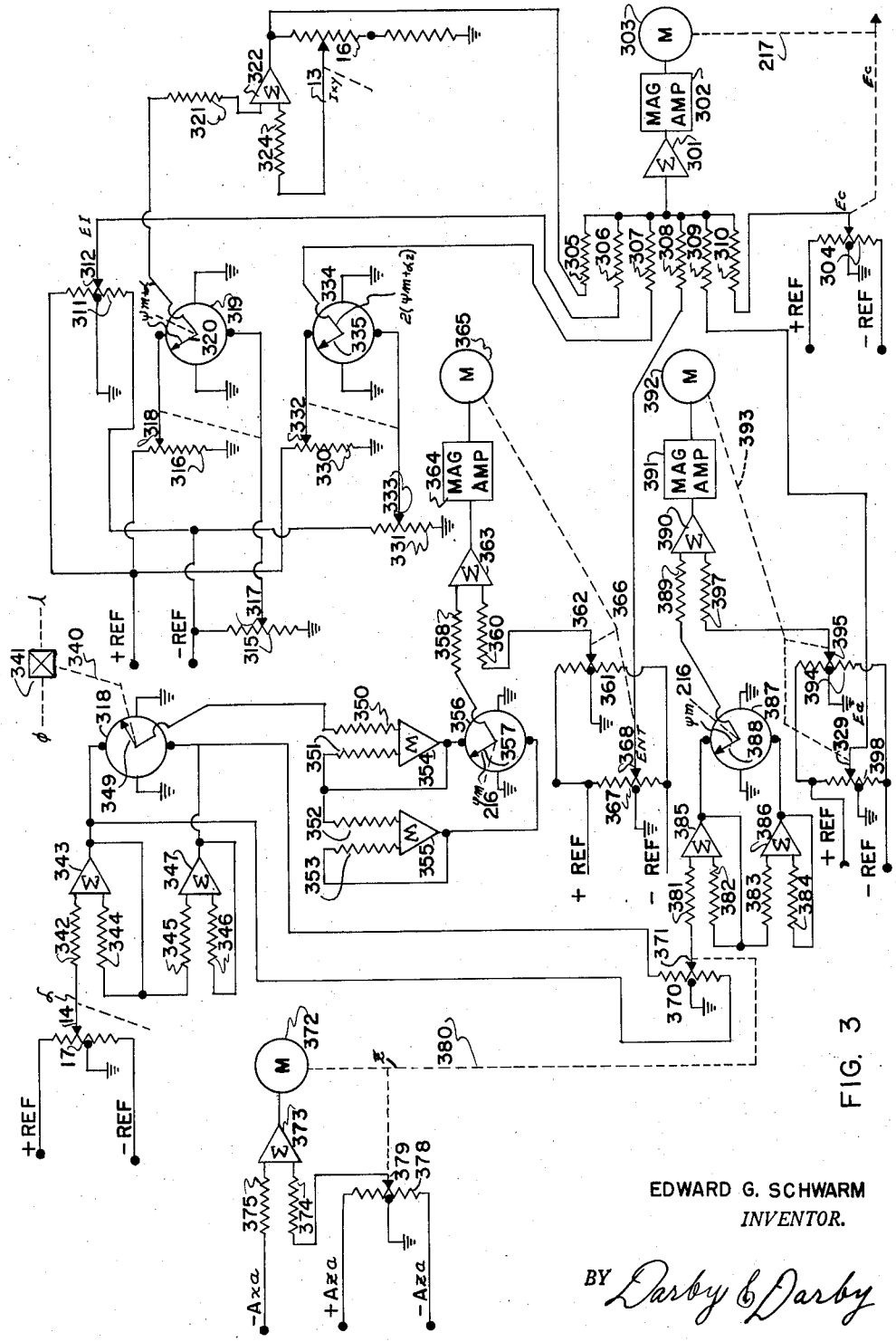

Other and further objects of the invention will be obvious and will become apparent to those skilled in the art as the description proceeds. For a better understanding of the invention, however, reference may be had to the following specification, taken in conjunction with the accompanying drawings, in which:

Fig. 1 is a perspective view of three-dimensional cam means provided for determining quantities varying with the simulated latitude and longitude of the movable craft;

Fig. 2 is an electrical schematic diagram illustrating a particular means for converting a simulated true heading indication such as may exist in a conventional grounded trainer to a simulated compass heading with simulated errors realistically introduced; and Fig. 3 is an electrical schematic diagram illustrating means for providing a simulated compass error computer quantity in accordance with the invention for application to a simulated magnetic direction indicator.

To simulate accurately the errors inherent in magnetic indicators, one may first obtain simulated variable quantities characteristic of the earth's magnetic field which vary with changes in the simulated position of the craft using the indicator. One of the important quantities varying with position is termed "magnetic variation" which may be defined at a given position, represented by a given latitude and longitude, as the angle between the true meridian and the magnetic meridian at that position on the earth's surface. Another magnetic characteristic varying with position on the earth's surface is the intensity of the horizontal component of the earth's magnetic field. A further magnetic characteristic of the earth's magnetic field which varies with instantaneous position is known as the "angle of dip," which may be defined as the angle made by the earth's field relative to a plane tangent to the surface of the earth at that particular position. Potentials representative of each of the three abovementioned quantities may be obtained by potentiometers adjusted manually or positioned automatically by mechanical means, or alternatively, suitable potentials may be derived by electrical function generators.

Since accurate and substantially continuous manual adjustment of these quantities by an instructor is extremely difficult and prevents proper observation by the instructor of other aspects of a trainer's performance, it is considered quite desirable to provide an automatic means for providing electrical potentials commensurate with the three quantities. As mentioned above, each of the three quantities is a function of both simulated latitude and simulated longitude. To provide fully automatic generation of the three potentials a function generator must be provided which will provide an output as a function of the two independent variables, latitude and longitude. One ideal form of two-variable function generation which may be used in conjunction with this invention is shown in application Serial Number 452,681, filed August 27, 1954, now Patent No. 2,886,244, by John M. Hunt for "Function Generator" and assigned to the same assignee as the present invention.

Fig. 1 illustrates a three-dimensional cam mechanical function generator. Cam 1 is contoured to reproduce the changing of magnetic variation for positions of changing simulated latitude and longitude. Cam 2 is contoured to reproduce variations in the intensity of the horizontal component of the earth's magnetic field with positions of different latitudes and longitudes. Cam 3 is contoured to reproduce changes of the "angle of dip" of the simulated magnetic field with changing positions determined by simulated values of latitude and longitude. Cams 1, 2 and 3 are all fixedly mounted on shaft 4, which is rotatably journalled in end plates 19 and 20 and driven by latitude motor 5 through gearing. For each of the three cams there is shown a cooperating lever 6 and a pivot member 7. As shown in Fig. 1, all three pivots 7 are fixedly connected together by the bars 8, so that longitude motor 9 geared to drive threaded shaft 10 simultaneously adjusts each pivot member 7 and its cooperating lever 6 in a direction parallel to the axis of the cams upon the occurrence of changes in simulated longitude. Each lever 6 has a feeler 11 mounted on one end to be positioned by one of the three cams. The other end of each lever carries a wiper contact 12, 13 or 14, which is electrically insulated from its lever and which is designed to traverse the winding of a potentiometer card. Small coil springs 21, 22 and 23, mounted on the pivot supports urge the levers clockwise as viewed in Fig. 1, maintaining the feelers 11 pressed against the cams. Each potentiometer resistance card is curved as shown in order to accommodate arctuate movement of the wiper arms due to the pivoting of their levers upon movement of their feelers with respect to the cams. Thus it will be seen that a potential may be derived on the wiper contact of potentiometer 15 which varies in accordance with simulated magnetic variation as a function of latitude (rotation of cam 1) and simulated longitude (axial traversing of cam 1), and that potentials commensurate with simulated horizontal magnetic intensity and simulated magnetic dip angle may be derived upon the wiper contacts of potentiometers 16 and 17 as functions of latitude and longitude. It should be noted that these potentials derived by the three-dimensional function generators may be proportional to absolute values of the quantities, or alternatively, may be proportional to the difference between absolute values and predetermined arbitrary values, as will be explained more fully hereinafter.

The three-dimensional cams shown in Fig. 1 are not drawn to scale, and reference may be had to any standard text on navigation for data indicating the variation of the three magnetic quantities with latitude and longitude. Since the cams shown are generally cylindrical in shape with their axial dimension corresponding to simulated longitude, it will be seen that the amount of simulated longitudinal travel which may occur without driving the feelers beyond the ends of their respective cams is limited. However, the scale of the cams may be chosen so that the length of each cylindrical cam represents the greatest variation in longitude likely to occur during a simulated flight. Also, it will be apparent to those skilled in the art as a result of this disclosure that a system similar to that shown in Fig. 1 may be provided and interconnected by simple switching so as to allow simulated flight unlimited in longitude. For example, the apparatus of Fig. 1 may be scaled so that the ends of each cylindrical cam represent the Greenwich Meridian. If a similar system is provided with cams whose ends represent 180 degree longitude positions, simple switching from one system to the other when simulated longitude neared the limiting longitudes of the one system would allow the simulation of complete global flights. If desired, the cams may be contoured so that rotation of the cams varies the potentiometers as a function of simulated longitude, and longitudinal movement of the feelers along the cams provide outputs as functions of simulated latitude. The function of latitude motor 5 and longitude motor 9 should then, of course, be interchanged.

The latitude and longitude motors 5 and 9 of Fig. 1 may be controlled in any desired manner without departing from the spirit of the present invention. For example, Fig. 3 of copending application No. 477,741, now Patent No. 2,925,667, filed by L. E. Fogarty for "Aircraft Trainer Apparatus" and assigned to the same assignee as the present invention is illustrative of an aircraft trainer apparatus generating simulated speed information in the form of North-South and East-West components and if desired, these speed components could be used to energize directly the latitude and longitude motors 5 and 9. However, if the distances over which the simulated craft is to simulate travel are great, and the simulated positions will vary greatly in latitude, it is necessary that energization of the longitude motor 9 be modified in accordance with the secant of the latitude as is well known in the navigation arts and shown in British Patent 738,452 dated October 10, 1955. In this manner, the actual scale changes in longitude which result from changes in latitude are considered.

As suggested above, many movable craft sometimes depend entirely upon magnetic indicators for navigation, an example being some contemporary aircraft. The present invention is very useful in conjunction with apparatus for simulating the flight and navigation of aircraft, and, in particular, of considerable value for simulating compass indications therein. In most modern flight simulators, a standard flight computer output quantity is a shaft position representing simulated true heading $\psi$ of the aircraft. For example, see Figure 4 of the above referred to co-pending Fogarty application where servo M-300 provides the heading $\psi$ as an output shaft position. The shaft may be utilized to position the slider of a conventional potentiometer so that an electrical potential commensurate with the simulated true heading is obtained.

Fig. 2 illustrates the use of this true heading information to calculate simulated instantaneous compass headings. As is well known, in order to convert a true heading to a compass heading, it is usual first to consider magnetic variation of the earth's magnetic field and to obtain what may be called "magnetic heading." To obtain compass heading from magnetic heading compass errors must be considered.

In Fig. 2 selsyn 201 receives a shaft position input in accordance with the true heading of the simulated craft from a conventional trainer source or computer input the rotor of selsyn 201 is energized from a power supply reference source as indicated. True heading information in the form of electrical voltages is fed to differential selsyn 202, which also receives an angular shaft input or computer input determined by the angle of magnetic variation for the simulated position of the craft. As is common knowledge, a westerly magnetic variation is added to true heading to obtain magnetic heading while an easterly magnetic variation is substracted from true heading to obtain a magnetic heading. As discussed above with reference to Fig. 1, a feeler 11 rides on cam 1 and moves a wiper 12 on potentiometer 15 (also shown in Fig. 2). Potentiometer 15 as shown in Fig. 2 is center-tapped to ground and energized at its end terminals by plus and minus reference voltages from a conventional computer power supply. Movement of wiper 12 in one direction from the center tap represents a westerly variation as a positive voltage, and movement of the wiper in the other direction from the center tap represents an easterly variation as a negative voltage. The output voltage from wiper 12 is fed to a conventional position servo system comprising amplifier 210, center-tapped follow-up potentiometer 220 and servo motor 209. The voltage on wiper 221 of follow-up potentiometer 220 is fed back to the servo input circuit. Shaft 215 of motor 209 mechanically positions the rotor of selsyn 202, and the position of shaft 215 represents an angular indication of instantaneous simulated variation. Magnetic heading voltage commensurate with the sum of true heading and magnetic variation are induced in the rotor windings of selsyn 202 and fed to the conventional position servo system shown as comprising selsyn 203, amplifier 204 and motor 205. The shaft 216 of motor 205 drives the rotor of selsyn 206 to a position which represents heading $\psi_m$ of the simulated craft, and the rotor of selsyn 206 is energized from the reference source. The output voltages induced in the stator coils of selsyn 206 are fed to differential selsyn 207, which also receives a shaft input 217 from a "compass error" position servo system to be discussed in more detail below in reference to Fig. 3. The output voltages from selsyn 207 therefore represent the sum of magnetic heading and compass errors and comprise a set of "compass heading" voltages. These voltages are fed to selsyn repeater 208 to provide a shaft rotation to position the card of a simulated magnetic direction indicator.

While it is a purpose of the present invention to simulate dynamic compass errors in compass indicators, caused by normal position, heading, and latitude changes of an actual craft, maneuvers of an extreme violence by an actual craft are likely to render the compass indications completely unusable. In an effort to simulate these conditions, the rotor coils of selsyns 206 and 208 are energized (in series) from reference alternating current power supply 232 to ground through relay contacts 211. Opening of these contacts removes reference voltage from the rotors of selsyns 206, 207 and 208, thereby disabling them as long as the contacts are held open. Relay coil 212, which operates the contacts 211, may be connected to be energized by a conventional simulator flight system upon occurrence of predetermined excessive amounts of pitching, banking and/or turning, for example. Either a single relay coil responsive to a plurality of simulated aircraft motions may be used, or alternatively, the contacts operated by a plurality of different relays may be connected in series with contacts 211. Relay coils utilized to open such contacts may be connected to potentiometers operated by pitching, banking and turning servos, or may be connected across the output terminals (preferably through the buffer stages) of electronic integrators which provide output potentials commensurate with the simulated quantities, which, if excessive, tend to disable magnetic direction indicating equipment. If servos are available to provide such quantities as shaft positions, relay coils may be dispensed with, and contacts such as 211 may be switched by cams operated by servo shafts.

By the apparatus shown schematically in Fig. 3, the component quantities which together comprise the total simulated compass error are derived and a summation made in the input of summing amplifier 301. The total compass error ($E_c$) voltage appearing at the output of amplifier 301 is changed to a shaft position angle by means of a position servo loop comprising summing amplifier 301, magnetic amplifier 302, motor 303, and follow-up potentiometer 304, which is driven by shaft 217 of motor 303. Potentiometer 304 is center-tapped to ground with its end terminals connected to plus and minus reference voltages. A bi-directional system is necessary since the total or resultant compass error may be either westerly or easterly (added or substracted in determining compass heading from magnetic heading). As shown in Fig. 3, summing amplifier 301 has in its input six summing resistors, identified as 305, 306, 307, 308, 309 and 310. Applied to a resistor 305 is a voltage which represents $E_{sc}$, which is a function of the simulated heading $\psi$ of the craft and the horizontal intensity of the magnetic field at the simulated position of the craft. Applied to amplifier 301 via resistor 306 is a voltage ($E_I$) which represents "index error," and which is constant at all headings. Applied to amplifier 301 via resistor 307 is a voltage ($E_q$) which is commensurate with simulated quadrantial error deviation, and which varies with simulated heading of the craft. Applied to resistor 308 is a voltage ($E_{nt}$) which represents simulated northerly turning error in the compass, and which quantity varies with the "angle of dip" of the earth's field at the simulated position of the craft, the bank angle of the craft, the slip angle of the craft, and the magnetic heading of the craft. Applied via resistor 309 is a voltage ($E_a$) which represents the acceleration error of the compass, which varies with the "angle of dip" of the earth's field at the simulated position of the craft, the instantaneous angle from vertical of the simulated apparent gravity vector, and the simulated magnetic heading of the craft. Aplied to amplifier 301 via resistor 310 is a rebalancing voltage ($E_c$) representing the total compass error as summed in amplifier 301, and which voltages balances the other input voltages to the amplifier so that motor 303 and shaft 217 maintain an angular position representing the compass error.

The compass "index error" or (lubber line misalignment) is the angle of misalignment between the longitudinal axis of the craft and the compass index or lubber line. This error is constant for a given craft and compass installation and results from improper installation of the compass in the aircraft. Since this error may be westerly or easterly (additive or subtractive in determining "compass heading" from "magnetic heading"), it may be simulated by a fixed adjustment by the instructor of manually-adjustable wiper 312 of center-tapped potentiometer 311, the end terminals of which are energized by plus and minus reference voltages. The amount and direction of wiper 312 adjustment determine the amount and sense of the fixed compass "index error" voltage applied via summing resistor 306 to amplifier 301.

The semi-circular deviation error in a compass reading, also known as the "hard iron" effect, is caused by permanent magnetism in the craft frame. The effect of the magnetic action of the frame is to modify the earth's magnetic field in the vicinity of the compass, with the result that the compass needle will not align itself with a magnetic meridian (even in the absence of all other compass errors), but instead, aligns itself along a "modified" field, causing an erroneous indication. Because the frame of the craft is effectively a permanent magnet, its effect on the earth's magnetic field is a function of the magnetic heading of the craft. Moreover, it has been shown that this error varies as a single cycle sinusoid with the heading at a fixed phase angle displacement. Also, since this error is dependent on the amount of distortion of the earth's magnetic field, and since the compass needle is considered to be operating with free movement in a horizontal plane only, it is a good approximation that this error varies inversely with the strength of the horizontal component of the earth's magnetic field. It has been found that a potential $E_{sc}$ simulating semi-circular error can be closely approximated by solving the following equation, which is sufficiently accurate for very realistic flight simulation:

$$E_{sc} \approx K_1 \sin (\psi_m + \alpha_1)/I_{xy} \qquad (1)$$

where:

$E_{sc}$ is the simulated semi-circular error,
$\psi_m$ is the simulated magnetic heading of the craft;
$\alpha_1$ is the error phase angle, which is a constant determined by the permanent magnet qualities of the particular craft being simulated;
$I_{xy}$ is the horizontal magnetic intensity of the earth's field at a simulated craft position; and
$K_1$ is a constant representing the maximum semi-circular error to be simulated.

Reference may now be made to Fig. 3. The above equation approximating the semi-circular error is solved by electro-mechanical means shown therein. $K_1$ the maximum semi-circular error, is represented by the output voltage of potentiometers 315 and 316 taken from their manually adjustable wipers 317 and 318. Potentiometers 315 and 316 are energized respectively by positive and negative reference voltages, so that the potential representing the simulated semi-circular error component may be either westerly or easterly (positive or negative). Wipers 318 and 317 of these potentiometers are mechanicaly ganged together, so that the output voltages on the wiper arms of potentiometers 315 and 316 may be adjusted simultaneously to derive equal voltages of opposite polarity representing maximum semi-circular error or K of the above Equation 1. These positive and negative potentials representing the quality $K_1$ are applied to excite the windings of a conventional sine function potentiometer or resolver 319. Wiper 320 of resolver 319 is positioned in accordance with the sum of the magnetic heading $\psi_m$ and the phase angle of the semi-circular error $\alpha_1$. This shaft position may be obtained in a conventional manner from shaft 216 which may be called a computer input representing $\psi_m$ with a constant angular offset of $\alpha_1$. The voltage output from wiper 320 represents the instantaneous value of $K_1 \sin (\psi_m + \alpha_1)$ which is the numerator of the right side of Equation 1. This voltage is fed to operational amplifier 322 through resistor 321. Division of this voltage by a value which may be called a computer input representing $I_{xy}$ is accomplished by placing a multiplying potentiometer 16 in a feed back circuit from the output of amplifier 322 to its input through resistor 324. Potentiometer 16 is shown in Fig. 1 where wiper 13 (also shown in Fig. 3) is moved in accordance with the horizontal intensity of the earth's magnetic field $I_{xy}$ corresponding to the instant simulated position of the craft. The output voltage from operational amplifier 322 represents the right hand side of Equation 1 above and is fed to summing resistor 305.

The quadrantal deviation error, also known as the "soft iron effect," is caused by the earth's magnetic field inducing magnetism in soft iron parts of the aircraft's frame. This induced magnetism disturbs the earth's magnetic field, and the compass needle no longer lines upon the magnetic meridian (disregarding all other errors) but it does line up on the modified field, thus forming an angular error. By virtue of this induced magnetism the craft is effectively a magnet, and the error resulting is a function of the magnetic heading of the craft. Moreover, it has been shown that this angular error varies as a two cycle sinusoid with heading. It has been found that simulated quadrantal error can be approximated by solving the following equation which is sufficiently accurate for flight simulation.

$$E_q \approx K_2 \sin 2(\psi_m + \alpha_2) \qquad (2)$$

where:

$E_q$ is the simulated quadrantal error,
$\psi_m$ is the simulated magnetic heading of the craft,
$\alpha_2$ is the error phase angle which is a constant determined by the soft iron qualities of the simulated craft; and
$K_2$ is a constant representing the maximum quadrantal error to be simulated.

Referring now to Fig. 3, the above equation approximating the quadrantal error is solved by electromechanical means. $K_2$, the maximum quadrantal error, is represented by the voltage output of potentiometers 330 and 331 taken from adjustable wipers 332 and 333. Potentiometers 330 and 331 are energized by positive and negative reference voltages such that the quadrantal error component may be either west or east (positive or negative respectively). Wipers 332 and 333 are mechanically ganged such that the outputs of potentiometers 330 and 331 can be adjusted simultaneously to create equal voltages of opposite polarity representing maximum quadrantal error or $K_2$ of the above Equation 2. The positive and negative potentials representing $K_2$ are fed into a conventional sine function potentiometer 334 designed to operate with 360 degrees of freedom. Wiper 335 on potentiometer 334 is positioned in accordance with twice the sum of the magnetic heading $\psi_m$ and the phase angle of quadrantal error $\alpha_2$. This shaft position can be obtained in a conventional manner from shaft 216 which may be called a computer input representing $\psi_m$ with a constant angular offset of $\alpha_2$ through step gearing. The voltage appearing at the wiper 335 represents the instantaneous value of product $K_2 \sin 2 (\psi_m + \alpha_2)$ which is the right hand side of Equation 2 above and it is fed to summing resistor 307.

As discussed above, the earth's magnetic field is made up of lines of force which at any particular position on the earth's surface other than the equator are oriented at an angle known as the "angle of dip" with respect to a plane tangent to the earth at that particular position. As a result, the earth's field can be thought of as containing components horizontal (or parallel) and vertical to this tangential plane. The compass needle is pivoted to indicate the direction of the horizontal component only. The northerly turning error is caused by the banking of the craft resulting in tilting of the compass card or needle. When the craft is maintaining a level attitude the compass needle lines up with only the horizontal component of the earth's magnetic field because it has no freedom of movement in the plane formed by the horizontal and vertical components. However, when the craft is banked the compass needle is also affected by the vertical component and the compass needle attempts to align itself with the earth's actual lines of force, resulting in error. The error is most noticeable on north and south headings. For a given change of bank attitude the northerly turning error can be calculated with necessary accuracy for flight simulators using the following equation:

$$E_{nt} \approx -\tan^1 (\tan \delta \sin (\phi + \lambda)) \cos \psi_m \qquad (3)$$

Where:

$E_{nt}$ is the simulated northerly turning error;
$\psi_m$ is the simulated magnetic heading of the craft;
$\delta$ is the angle of dip of the earth's field at the simulated position;
$\phi$ is the simulated bank angle of the craft; and
$\lambda$ is the simulated ball deflection of the craft.

Referring now to Fig. 3 where the above Equation 3 is solved by electromechanical means. A voltage representing the tangent of the angle of dip (tan $\delta$) for a simulated position is taken from a conventional center tapped tangential potentiometer 17 through adjustable wiper 14. Both tangential potentiometer 17 and wiper 14 are shown in Fig. 1 where wiper 14 is adjusted in accordance with cam 3 following changes in simulated position of the craft and which may be described as a computer input. Center tapped potentiometer 17 is energized at its terminals by positive and negative reference voltages such that the value of tan $\delta$ can have meaning when the simulated position of the craft is in either the northern or southern hemisphere. The voltage taken from wiper 14 representing tan $\delta$ is applied to buffer amplifier 343 through resistor 342. The output from buffer amplifier 343 is applied to a phase inversion amplifier 347 through resistor 345. Both amplifier 343 and amplifier 347 have feed back circuits through resistors 344 and 346 respectively. The positive and negative output voltages from amplifiers 343 and 347 are connected to excite the windings of a conventional sine function potentiometer 318. Wiper 349 is driven by shaft 340 which is positioned according to the output of a conventional summing device 341. Summing device 341 has two shaft inputs one representing simulated bank angle $\phi$ and the other representing slip angle $\lambda$ each of which may be called a computer input. Bank angle and slip angle information is conventional computer information readily available in simulators as exemplified in an above mentioned copending application of L. E. Fogarty.

The voltage appearing on wiper 349 represents the product tan $\delta$ sin $(\phi+\lambda)$ and it is applied to a buffer amplifier 354 and phase inversion amplifier 355 in the same manner as described above in reference to amplifiers 343 and 347. Resistors 350, 351, 352 and 353 function and are connected in the same manner as corresponding resistors 342, 344, 345 and 346 described above. The outputs from amplifiers 354 and 355 are used to energize a conventional cosine potentiometer 356. Wiper 357 of potentiometer 356 is positioned by shaft 216 in Fig. 2 in accordance with magnetic heading $\psi_m$ which may be described as a computer input. The voltage appearing on wiper represents the product tan $\delta$ sin $(\phi+\lambda)$ cos $\psi_m$. In order to convert this voltage into a shaft position this product voltage is then fed into a conventional position servo loop through resistor 358. The servo loop amplifies the input voltage in amplifier 363 and further amplifies it in magnetic amplifier 364, thereby energizing a motor 365 in direction in accordance with the polarity of the input voltage. The motor 365 drives a shaft 366 thereby positioning a wiper 362 on a center tapped follow-up tangent function potentiometer 361 which is energized at its terminals by a plus and minus reference voltage. The follow up voltage taken by wiper 362 from potentiometer 361 is applied to the input of amplifier 363 through resistor 360 with such a polarity as to oppose the input signal representing the product of tan $\delta$ sin $(\phi+\lambda)$ cos $\psi_m$. Motor 365 is energized until the wiper 362 voltage causes the resultant input to amplifier 363 to reach a null. Because the right hand side of the Equation 3 above contains the expression $\tan^{-1}$ (arc tangent), it is necessary that the angle whose tangent is equal to the product tan $\delta$ sin $(\phi+\lambda)$ cos $\psi_m$ be determined. This is accomplished by making follow-up potentiometer 361 tangential in function. Thus the angular position of shaft 366 is then representative of the solution of Equation 3 above. $E_{nt} \approx -\tan^{-1} (\tan \delta \sin (\phi+\lambda)) \cos \psi_m$.

Since it is desirable to have a voltage representing the northerly turning error angle ($E_{nt}$) the shaft 366 also drives a wiper 368 on a linear, center-tapped potentiometer 367 energized at opposite terminals by plus and minus reference voltages. A voltage representing $E_{nt}$ is present on wiper 368 and is applied to summing resistor 308.

The acceleration error in a magnetic indicator is caused by tilting of the compass card or needle. As discussed above, the compass card or needle is pivotally mounted so as to be responsive to the direction of only the horizontal component of the earth's magnetic field, and error results when other influences, such as acceleration, cause the card or needle to line up or tend to line up with the earth's total field. The error caused by acceleration is most noticeable on North and South headings. For a given swing of an apparent gravity vector from vertical caused by acceleration, the acceleration error in a magnetic indicator may be calculated using the following equation:

$$E_A \approx \tan^{-1} (\tan \delta \sin Z) \sin \psi_m \qquad (4)$$

where:

$E_A$ is the simulated acceleration error;
$\psi_m$ is the simulated magnetic heading of the craft;
$\delta$ is the angle of dip of the earth's field at the simulated position;
$Z$ is the angle from vertical of the apparent gravity vector measured in the vertical plane parallel to the longitudinal axis of the craft.

Reference may now be had to Fig. 3, where Equation 4 is solved by electromechanical means. Where the angle Z is quite small it may be calculated with sufficient accuracy by small angle approximation using the following equation:

$$Z = \frac{A_{xa}}{A_{za}}$$

where:

$A_{xa}$ is the acceleration of the craft along its X or longitudinal axis and
$A_{za}$ is the acceleration of the craft along its Z or vertical axis.

The quantities $A_{xa}$ and $A_{za}$ are conventional computer quantities readily available as voltages or shaft positions in simulators, as exemplified in the above-mentioned co-pending application of L. E. Fogarty. A voltage representative of $-A_{xa}$ is applied to amplifier 373 through resistor 375. The voltage output from amplifier 373 is applied to energize motor 372, which drives shaft 380. Shaft 380 moves a wiper 379 on center-tap potentiometer 378, which is energized at its terminals by plus $A_{za}$ and minus $A_{za}$ voltages. The voltage output from wiper 379 representing $A_{za}$ is applied to the amplifier 373 with a polarity to oppose and null out the voltage representing $A_{xa}$. When motor 372 has driven shaft 380 and wiper 379 to a position such that the voltage resultant applied to the input of amplifier 373 is zero, the motor 372 will be de-energized, and the angular position of this shaft 380 will represent the angle Z or the ratio $$\frac{A_{xa}}{A_{za}}$$

The dividing servo loop shown above is conventional in the computer arts.

Shaft 380 representing angle Z is used to position wiper 371 on conventional sine function potentiometer 370, which is energized at its terminals by the output voltages of amplifiers 343 and 347, previously discussed. These voltages represent $+\tan \delta$ and $-\tan \delta$, respectively. As a result of this circuitry the voltage appearing at wiper 371 represents the product tan $\delta$ sin Z. This voltage is applied to buffer amplifier 385 through resistor 381. The output from buffer amplifier 385 is applied to phase inversion amplifier 386 through resistor 383. Both amplifiers 385 and 386 have feedback circuits through resistors 382 and 384 respectively. The positive and negative output voltages from amplifiers 385 and 386 are connected to excite the windings of a conventional sine function potentiometer 387. Wiper 388 is driven by shaft 216 (Fig. 2), which is positioned according to the magnetic heading $\psi_m$. The voltage appearing on wiper 388 represents the product tan $\delta$ sin Z sin $\psi_m$ In order to convert this voltage into shaft position, this product voltage is then fed into a conventional servo loop through resistor 389. This loop consists of means for amplifying the input voltage in amplifier 390, means for further amplifying the signal in magnetic amplifier 391 to cause motor 392 to rotate in a direction dependent upon the polarity of the input voltage applied to amplifier 390. Motor 392 drives shaft 393, thereby positioning a wiper 395 on a center-tapped follow-up tangent function potentiometer 394, which is energized at its terminals by plus and minus reference voltages. The follow-up voltage taken by wiper 395 from potentiometer 394 is applied to the input of amplifier 390 through resistor 397 with such a polarity as to oppose the input voltage representing the product of tan $\delta$ sin Z sin $\psi_m$. Motor 392 is energized until the wiper 395 voltage causes the resultant input to the amplifier to reach a null. Because the right hand side of the Equation 4 above contains the expression $\tan^{-1}$ (arc tangent), it is necessary that the angle whose tangent is equal to the product tan $\delta$ sin Z sin $\psi_m$ be determined. This is accomplished by making follow-up potentiometer 394 tangential in function. Thus the angular position of shaft 393 is representative of the solution of Equation 4 above.

Since it is desirable to have a voltage representing the acceleration error angle $E_a$, the shaft 393 also drives a wiper 329 on a linear center-tapped potentiometer 398 energized at opposite terminals by plus and minus voltages, respectively. A voltage representing $E_a$ is present on wiper 329 and is applied to summing resistor 309.

Thus it can be seen that the invention simulates each of the component quantities which together comprise total simulated compass error, and applies them in combination to the input of summing amplifier 301 in the manner described above. It should be noted that the right hand side of Equation 3 which has been described as commensurate with northerly turning error is of an opposite polarity to the right hand side of Equation 4 which has been described as commensurate with the acceleration error. Obviously the polarity of the quantities summed in amplifier 301 may be used to account for these opposing error quantities.

It will thus be seen that the objects set forth above, among those made apparent from the preceding description, are efficiently attained. Since certain changes may be made in carrying out the teachings of the application without departing from the scope of this invention, it is intended that all matter contained in the above description or shown in the accompanying drawings shall be interpreted as illustrative and not in a limiting sense. For example, while direct current computation has been used in the above disclosed embodiment, it is obvious that the invention can be practiced using A.C. computation techniques using components adapted for that purpose. While the summing devices have been shown herein as comprising parallel-adding feedback amplifiers, differential synchros and mechanical differentials, a variety of equivalent summing devices well-known to those skilled in the art may be readily substituted without departing from the invention. While compass error component voltages have been shown as added in parallel in the disclosed embodiment, series summing may be employed. The resistance resolvers shown in the disclosed embodiment have been shown as comprising linearly-actuated arms cooperating with tangential sinusoidal and cosinusoidal function windings. However, the resolvers may utilize linear windings and trigometric mechanical actuating means for the arms, such as scotch yoke, for example, for sine and cosine resolution.

It is also to be understood that the following claims are intended to cover all of the generic and specific features of the invention herein described, and all statements of the invention which as a matter of language, might be said to fall therebetween.

Having described my invention, what I claim as new and desire to secure by Letters Patent is:

1. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities such that the resultant is a resultant shaft position quantity commensurate with a simulated magnetic heading, means for providing a third computer shaft position input quantity commensurate with simulated compass error, computer means for combining said resultant shaft position quantity and said third computer shaft position input quantity to provide a quantity commensurate with simulated compass heading.

2. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities to provide a resultant shaft position quantity commensurate with simulated magnetic heading, means for providing a third computer shaft position input quantity commensurate with simulated compass error, computer means for combining said resultant quantity and said third computer input quantity to provide an output indication commensurate with simulated compass heading; said means for providing said third computer input quantity comprising means for providing a component voltage commensurate with a simulated index error angle, means for providing a component voltage commensurate with a simulated semicircular error angle, means for providing a component voltage commensurate with a quadrantal error angle, means for providing a voltage component commensurate with a northerly turning error angle, means for providing a component voltage commensurate with an acceleration error angle, and means responsive to a summation of said component voltages for applying said third input quantity to said combining means.

3. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities to provide a resultant shaft position quantity commensurate with a simulated magnetic heading, means for providing a third computer shaft position input quantity commensurate with simulated compass error, computer means for combining said resultant and said third computer input quantity providing a shaft position quantity commensurate with simulated compass heading, said means providing a third computer input comprising further computer means for providing a voltage component commensurate with a semicircular error angle.

4. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities to provide a resultant shaft position quantity commensurate with a simulated magnetic heading, means for providing a third computer shaft position input quantity commensurate with simulated compass error, computer means for combining said resultant and said third computer input quantity to provide a shaft position quantity commensurate with simulated compass heading, said means for providing a third computer input quantity comprising further computer means for providing a voltage component commensurate with a quadrantal error angle.

5. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities to provide a resultant shaft position quantity commensurate with a simulated magnetic heading, means for providing a third computer shaft position input quantity commensurate with simulated compass error, computer means for combining said resultant and said third computer input quantity providing a quantity commensurate with simulated compass heading, said means providing a third computer input comprising further computer means for providing a voltage component commensurate with a northerly turning error angle.

6. A grounded trainer apparatus comprising means for providing a first computer shaft position input quantity commensurate with simulated true heading, means responsive to simulated latitude and longitude for providing a second computer shaft position input quantity commensurate with simulated magnetic variation at said simulated latitude and longitude, computer means for combining said first and second quantities, such that the resultant is a shaft position quantity commensurate with a simulated magnetic heading, means for providing a third computer input quantity commensurate with simulated compass error, computer means for combining said resultant and said third computer input quantity to provide a quantity commensurate with simulated compass heading, said means for providing a third computer input comprising further computer means for providing a voltage component commensurate with an acceleration error angle.

7. A grounded trainer apparatus for simulated mobile craft, means for simulating semi-circular compass error, comprising means producing a first voltage commensurate with the maximum semi-circular error to be simulated, a shaft positioned in accordance with an angle commensurate with a summation of an instantaneous simulated magnetic heading and a constant semicircular error phase angle, means for developing a second voltage commensurate with the product of said first voltage and the sine of said shaft position angle, a means for producing a third voltage commensurate with the horizontal magnetic intensity of the earth's field, means for dividing said second voltage by said third voltage.

8. A grounded trainer apparatus for a simulated mobile craft, means for simulating quadrantal compass error, comprising a means producing a first voltage commensurate to the maximum quadrantal error to be simulated, a shaft positioned in accordance with twice an angle commensurate with a summation of a simulated instantaneous magnetic heading and a constant quadrantal compass error phase angle, a means for developing a second voltage commensurate with the product of said first voltage and the sine of said shaft position angle.

9. A grounded trainer apparatus for a simulated mobile craft, means for simulating northerly turning compass error, comprising computer input means representing the magnitude of the angle of dip of the earth's magnetic field for a simulated position, means for obtaining a first voltage commensurate with the tangent of said angle of dip, a first shaft position angle commensurate with a summation of the bank and slip angle of said simulated mobile craft, means for obtaining a second voltage by multiplying said first voltage by the sine of said first shaft position angle, a second shaft position commensurate with the simulated magnetic heading of said craft, means for obtaining a third voltage by multiplying said second voltage by the cosine of said second shaft position angle, means for obtaining the angle whose tangent is equal to said third voltage and commensurate with said northerly turning error.

10. A grounded trainer apparatus for simulated mobile craft, means for simulating an acceleretion compass error, comprising a computer input means commensurate with the magnitude of the angle of dip of the earth's magnetic field for a simulated position, means for obtaining a first voltage commensurate with the tangent of said angle of dip, means for producing a first shaft position angle commensurate with the angle of the apparent gravity from vertical caused by the acceleration of the craft in its longitudinal axis, means for producing a second voltage commensurate with the product of the sine of said first shaft position angle and said first voltage, means for producing a second shaft position angle commensurate with the simulated magnetic heading of said craft, means for producing a third voltage commensurate with the product of the sine of said second shaft position angle and said second voltage, means for obtaining the angle whose tangent is equal to said third voltage and commensurate with said acceleration error.

11. A grounded trainer apparatus means for simulating compass error in a simulated mobile craft comprising a first shaft positioned in accordance with an angle commensurate with a simulated magnetic heading, means for providing a first voltage commensurate with the tangent of the angle of dip of the earth's magnetic field for a simulated position, a second shaft position angle commensurate with a summation of the bank and slip angle of said simulated mobile craft, means for obtaining a second voltage by multiplying said first voltage by the sine of said second shaft position, means for obtaining a third voltage by multiplying said second voltage by the cosine of said first shaft position angle, means for producing a third shaft position angle commensurate with the angle of the apparent gravity from vertical caused by the acceleration of said craft in its longitudinal axis, means for producing a fourth voltage commensurate with the product of the sine of said third shaft position angle and said first voltage, means for producing a fifth voltage commensurate with the product of the sine of said first shaft position angle and said fourth voltage, means for obtaining the angle whose tangent is equal to said third potential and commensurate with a northerly turning error, means for obtaining the angle whose tangent is equal to said fifth voltage and commensurate with an acceleration error.

12. A grounded trainer apparatus means responsive to simulated latitude and longitude of a simulated mobile craft for simulating magnetic compass error of said simulated mobile craft comprising means for providing a first computer shaft position input quantity commensurate with a simulated magnetic heading at said simulated latitude and longitude, means for providing a second computer input comprising a second voltage commensurate with the tangent of the angle of dip of the earth's magnetic field, means for providing a third computer shaft position input quantity commensurate with the angle of the apparent gravity from vertical caused by the acceleration of said craft along its longitudinal axis, a fourth computer input commensurate with the angle of bank and side slip of simulated mobile craft, computer means responsive to said first, second and fourth computer input quantities for providing a potential commensurate with the northerly turning error, and means responsive to said first, second and third computer input quantities for providing a further potential commensurate with the acceleration error component of the compass error.

13. A grounded trainer apparatus means responsive to simulated latitude and longitude of a simulated mobile craft for simulating compass error of said simulated mobile crank comprising means for deriving a first computer shaft position input quantity commensurate with a simulated magnetic heading at said simulated latitude and longitude, means for deriving a second computer input in the form of a voltage commensurate with the tangent of the angle of dip of the earth's magnetic field, and means for providing a second voltage commensurate with the angle of the apparent gravity from vertical caused by the acceleration of said craft along its longitudinal axis, the last recited means comprising means for deriving third and fourth voltages commensurate respectively with accelerations of said aircraft along its longitudinal and vertical axes, and means responsive to said third and fourth voltages for providing said second voltage commensurate with the ratio between said third and fourth voltages.

14. A grounded trainer apparatus means responsive to simulated latitude and longitude of a simulated mobile craft for simulating compass error of said simulated mobile craft comprising means for providing a first computer shaft position input quantity commensurate with a simulated magnetic heading at said simulated latitude and longitude, means for providing a voltage commensurate with the angle of dip of the earth's magnetic field, means for providing a third computer shaft position quantity commensurate with the summation the simulated bank and ball bank angles of the simulated craft, means for deriving a fourth computer voltage commensurate with the angle of the apparent gravity from vertical caused by the acceleration of said craft in its longitudinal axis, computer means responsive to said first, second, and third computer inputs for providing a voltage commensurate with the northerly turning error, computer means responsive to said first, second and fourth computer inputs for providing a voltage commensurate with the acceleration error component of the compass error of the craft.

15. A grounded trainer apparatus means responsive to simulated latitude and longitude of a mobile craft for simulating compass error of said mobile craft comprising means for providing a first shaft position commensurate with the magnetic heading of the craft at said simulated latitude and longitude, a second shaft positioned commensurate with twice the magnetic heading of the craft, means for providing a voltage commensurate with the horizontal component of the earth's magnetic field for a simulated position of the craft, means responsive to said first shaft position and said voltage commensurate with the horizontal component of the earth's magnetic field for providing a second voltage commensurate with the semi-circular error component of the compass error, and means responsive to said first shaft position for providing a third voltage commensurate with the quadrantal error component of the compass error.

16. A grounded trainer apparatus means responsive to simulated latitude and longitude of a simulated mobile craft for simulating compass error of such simulated mobile craft comprising means for positioning a shaft in accordance with magnetic heading of said craft at said simulated latitude and longitude, means responsive to said shaft position for providing a first voltage commensurate with the northerly turning error component of the craft compass error, means responsive to said shaft position for providing a second voltage commensurate with the acceleration error component of the craft compass error, means responsive to said shaft position for providing a third voltage commensurate with the semi circular error component of the craft compass error, means responsive to said shaft position for providing a fourth voltage commensurate with a quadrantal error, means responsive to said voltages for providing a second shaft position commensurate with a simulated compass error, and a simulated compass instrument responsive to said magnetic heading shaft and said second shaft position for providing a simulated direction indication with realistically introduced errors.

17. A grounded trainer apparatus means responsive to simulated latitude and longitude of a simulated mobile craft for simulating compass error of said simulated mobile craft comprising means for providing a shaft positioned commensurate with magnetic heading at said simulated latitude and longitude, means responsive to said shaft position for providing a first voltage commensurate with the northerly turning component of the craft compass error, means responsive to said shaft position for providing a first voltage commensurate with the acceleration error component of the craft compass error, means responsive to said shaft position for providing a second voltage commensurate with the semi circular error component of the craft compass, means responsive to said shaft position for providing a third voltage commensurate with a quadrantal error, summing means responsive to each of said compass error components for providing a resultant voltage commensurate with the total compass error, means responsive to said resultant voltage for providing a second shaft position commensurate with simulated compass error, and a simulated compass instrument responsive to said magnetic heading shaft position and said second shaft position for providing a simulated direction indication.

References Cited in the file of this patent

UNITED STATES PATENTS

| | | |
|---|---|---|
| 2,506,998 | Dehmel | May 9, 1950 |
| 2,510,580 | Kail | June 6, 1950 |
| 2,753,498 | Gray | July 3, 1956 |